US011982428B1

(12) United States Patent
Liu

(10) Patent No.: US 11,982,428 B1
(45) Date of Patent: May 14, 2024

(54) LIGHT BULB STRUCTURE

(71) Applicant: Xiuli Liu, Zhumadian (CN)

(72) Inventor: Xiuli Liu, Zhumadian (CN)

( * ) Notice: Subject to any disclaimer, the term of this patent is extended or adjusted under 35 U.S.C. 154(b) by 0 days.

(21) Appl. No.: 18/140,559

(22) Filed: Apr. 27, 2023

(51) Int. Cl.
*F21V 19/00* (2006.01)
*F21V 15/01* (2006.01)
*F21V 23/02* (2006.01)

(52) U.S. Cl.
CPC ............ *F21V 19/006* (2013.01); *F21V 15/01* (2013.01); *F21V 19/0005* (2013.01); *F21V 23/02* (2013.01)

(58) Field of Classification Search
CPC .......... F21V 23/05; F21V 15/01; F21K 9/272; F21K 9/237
See application file for complete search history.

(56) References Cited

FOREIGN PATENT DOCUMENTS

CN 106322158 A * 1/2017

OTHER PUBLICATIONS

Innovation Q+ NPL Search (Year: 2023).*

* cited by examiner

*Primary Examiner* — Anabel Ton
(74) *Attorney, Agent, or Firm* — Birchwood IP

(57) ABSTRACT

The present application discloses a new light bulb structure, which relates to the field of lighting equipment, comprising a wick, which comprises a light bar, an upper end of the light bar is provided with positive and negative poles, and the positive and negative poles are connected to the lamp cap, the positive and negative poles are provided with a protection resistor, an outer surface of the protection resistor is provided with a resistor housing, and the resistor housing is fixed in a center slot of the fixing seat, the fixing seat is connected to an inner buckle of a joint of the lamp body, and an outer surface of the joint of the lamp body is connected to the lamp cap.

5 Claims, 3 Drawing Sheets

LIGHT BULB STRUCTURE

TECHNICAL FIELD

The present application relates to the field of lighting technology, more specifically to the field of light bulb structure design.

BACKGROUND

With the development of lighting technology, traditional incandescent lamps (tungsten filament lamps) are gradually being eliminated due to their high energy consumption and short service life, and replaced by LED bulbs. The shape of the LED light bulb is similar to that of a traditional incandescent light bulb, and it adopts the existing traditional screw socket and socket connection method, which is in line with people's habit of using light bulbs.

However, the LED bulbs are all cast in one piece now, and the bulbs will be scrapped when the electric pins that are poured in are broken. At the same time, because the bulb is placed outdoors for a long time, it is easy to cause water accumulation in the bulb. For this reason, it is necessary to design a kind of novel light bulb structure.

SUMMARY OF THE APPLICATION

Aiming at the deficiencies of the above-mentioned technologies, this application proposes a new light bulb structure to solve the problem that the LED light bulb is cast in one piece, and the light bulb will be scrapped when the electric pin inside the pouring is broken, and the problem of water accumulation in the light bulb because the light bulb is placed outdoors for a long time. The light bulb structure is a hollow structure, which solves the problem that the light bulb will be scrapped when the electric pin is broken. At the same time, the lower end of the light bulb housing uses drainage holes to solve the problem of easy water accumulation in the outdoor light bulb.

This application adopts the following technical solutions: A new light bulb structure, comprises a light bar, an upper end of the light bar is provided with positive and negative poles, and the positive and negative poles are connected to the lamp cap, the positive and negative poles are provided with a protection resistor, an outer surface of the protection resistor is provided with a resistor housing, and the resistor housing is fixed in a center slot of the fixing seat, the fixing seat is connected to an inner buckle of a joint of the lamp body, and an outer surface of the joint of the lamp body is connected to the lamp cap.

Further, the fixing seat is configured to be a hollow structure, and eight clamping plates are arranged in the fixing seat at equal intervals.

Further, an upper end of the resistor housing of the wick is provided with a ring boss, and upper ends of the eight clamping plates are provided with an L-shaped clamping slot for connecting the ring boss near the central slot.

Further, two butt joints are provided on opposite sides of the ring boss, and the L-shaped clamping slot is provided with two opposite short-side L-shaped clamping slots on both sides for the butt joint clamping.

Further, ten triangular teeth are provided on upper surface of the fixing seat, and six fixing blocks are arranged on outer surface of the fixing seat at equal intervals.

Further, lower end of the lamp body is provided with drainage holes.

Beneficial Effects of the Application

The fixing seat structure of the present application adopts a hollow structure, and the ring boss on the resistor housing on the wick is connected with the clamping slot surrounded by the clamping plate in the holder, so that the wick can be removed and replaced at any time when the positive and negative poles of the bulb are disconnected, which solves the problem that the bulb will be scrapped when the electric pin is broken, and reduces the cost; At the same time, the lower end of the light bulb housing uses drainage holes to solve the problem of easy water accumulation in the outdoor light bulb.

BRIEF DESCRIPTION OF THE DRAWINGS

In order to more clearly illustrate the technical solutions in the embodiments of the present application or the prior art, the following will briefly introduce the accompanying drawings that need to be used in the description of the embodiments or the prior art. Obviously, the accompanying drawings in the following description are only some embodiments of the application. For those skilled in the art, other drawings can also be obtained according to the structures shown in these drawings without any creative effort.

In the figure, 1—Light bar; 2—Protection resistor; 3—Resistor housing; 4—Fixing seat; 5—Clamping plate; 6—Lamp cap; 7—Lamp body; 8—Fixing block; 9—Triangular teeth; 10—Inner buckle; 11—L-shaped clamping slot; 12—Short-side L-shaped clamping slot; 13—Ring boss; 131,132—Butt joints.

DETAILED DESCRIPTION

Preferred embodiments of the present application will be described below with reference to the accompanying drawings. It should be understood that the embodiments described here are only used to illustrate and explain the present application, and are not intended to limit the present application.

Figure 1:
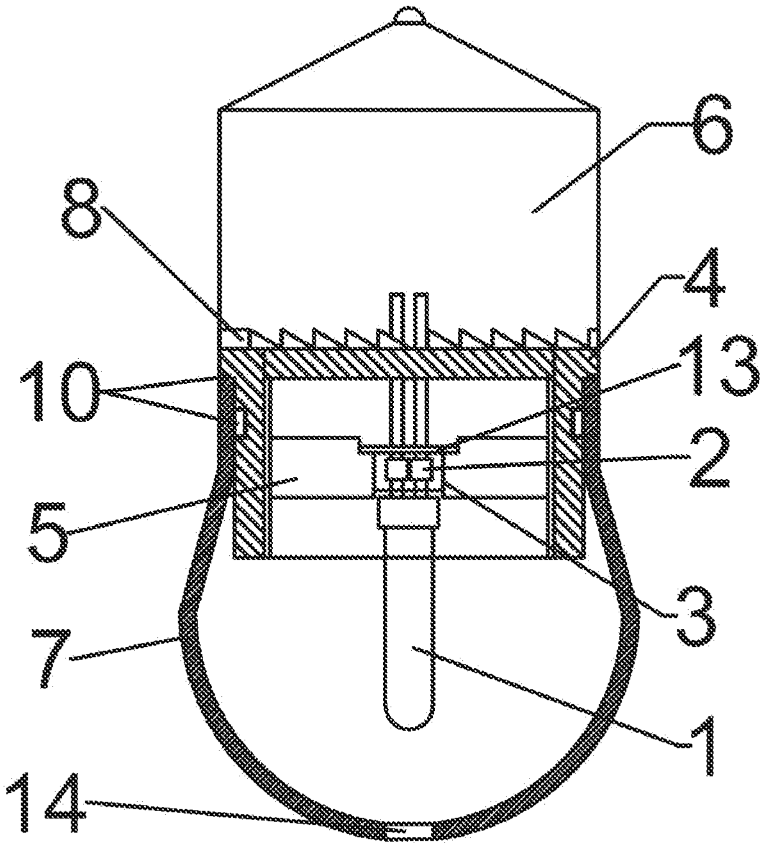
FIG. 1 is the overall sectional schematic diagram of novel light bulb structure.
Figure 2:
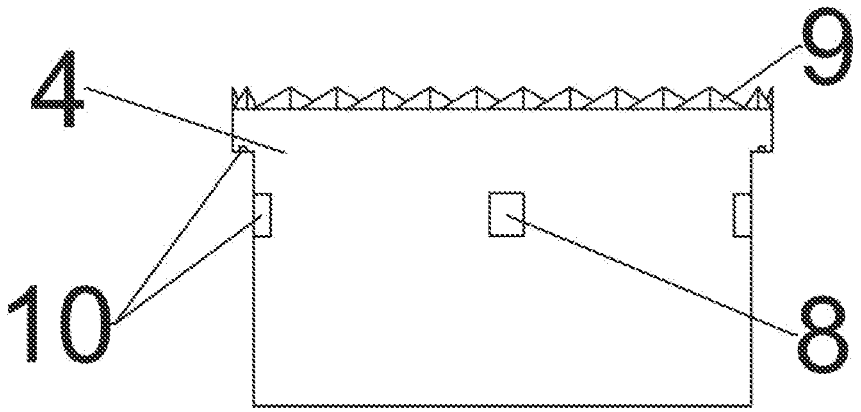
FIG. 2 is a schematic structural diagram of the fixing seat of the novel light bulb structure in a front view.
Figure 3:
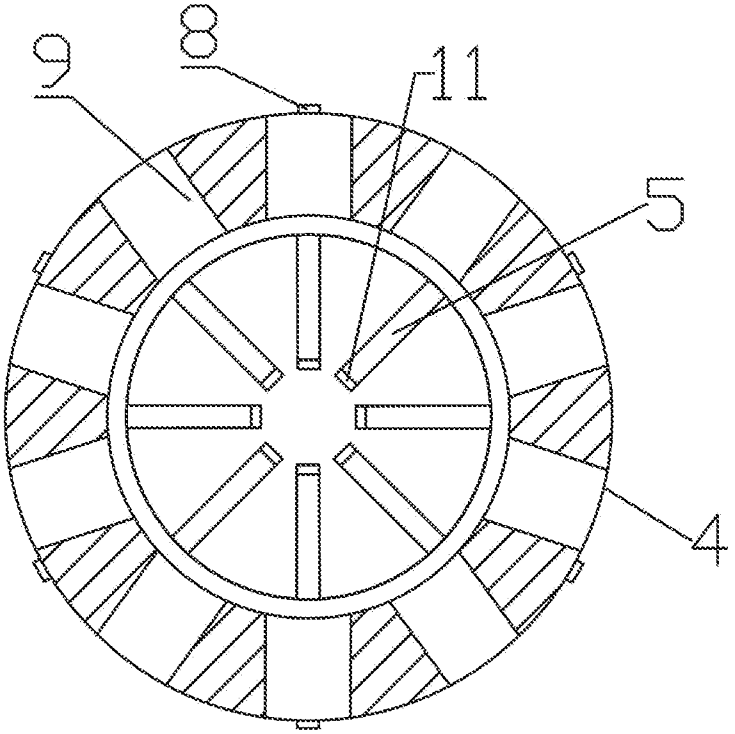
FIG. 3 is schematic structural diagram of the fixing seat of the novel light bulb structure in a top view.
Figure 4:
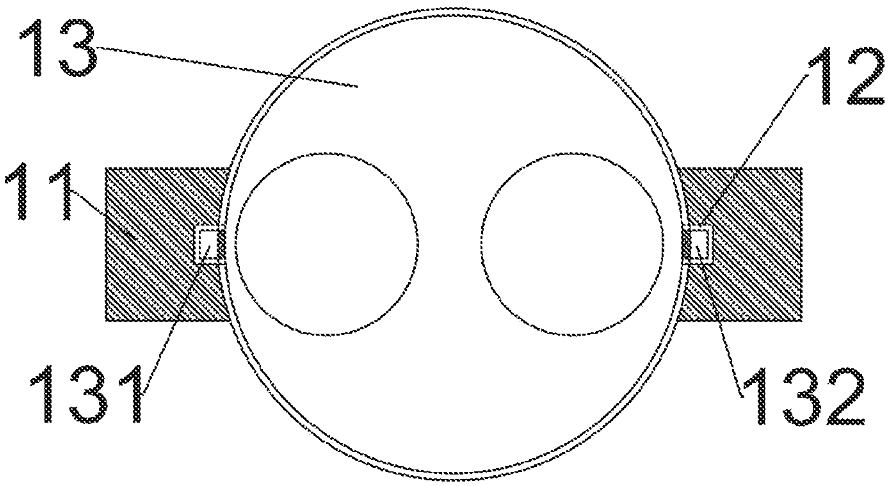
FIG. 4 is a schematic structural diagram of a top view of the novel light bulb with a ring boss.

As shown in FIG. 1, FIG. 2, FIG. 3, and FIG. 4, a new light bulb structure includes a wick, wherein the wick comprises a light bar 1, an upper end of the light bar 1 is provided with positive and negative poles, and the positive and negative poles are connected to the lamp cap 6, the positive and negative poles are provided with a protection resistor 2, an outer surface of the protection resistor 2 is provided with a resistor housing 3, and the resistor housing 3 is fixed in a center slot of the fixing seat 4, the fixing seat 4 is connected to an inner buckle 10 of a joint of the lamp body 7, and an outer surface of the joint of the lamp body 7 is connected to the lamp cap 6.

In the embodiment of the present application, the fixing seat 4 is configured to be a hollow structure, and eight clamping plates 5 are arranged in the fixing seat 4 at equal intervals, thereby preventing the positive and negative poles from being broken and irreparable.

In the embodiment of the present application, an upper end of the resistor housing 3 of the wick is provided with a ring boss 13, and upper ends of the eight clamping plates 5 are provided with an L-shaped clamping slot 11 for connecting the ring boss 13 near the central slot to realize the fixing of the wick.

In the embodiment of the present application, two butt joints 131, 132 are provided on opposite sides of the ring boss 13 and the L-shaped clamping slot 11 is provided with two opposite short-side L-shaped clamping slots 12 on both sides for the butt joint clamping, to prevent the wick from rotating in the fixing seat 4.

In the embodiment of the present application, ten triangular teeth 9 are provided on the upper end surface of the fixed seat 4, and six fixed blocks 8 distributed at equal intervals are arranged on the outer surface of the fixed seat 4, so as to realize the fixing between the fixing seat 4 and the lamp body 7, and during the installation process, the fixing seat 4 presses the wick inwards to achieve further fixing.

In the embodiment of the present application, the lower end of the lamp body 7 is provided with drainage holes, to solve the problem of long-term accumulation of water and drainage in the outdoor interior of the bulb.

The lamp cap of the present application adopts the solderless 126 type lamp cap as prior art, so it will not be repeated here.

Working Principe of the Present Application:

When using this application, first insert the wick from the center slot of the fixing seat 4 from top to bottom until the ring boss 13 on the resistor housing 3 of the wick snaps into the L-shaped slot on the upper end of the clamping plate. Wherein the butt joint on the ring boss 13 is connected with the short side L-shaped slot, and then the fixing seat 4 is connected with the lamp body 7. Under the action of the fixing block 8 on the outer wall of the fixing seat 4 and the inner wall of the joint of the lamp body 7, the fixing seat 4 is clamped, and the fixing seat 4 is compressed to the inside at the same time, and the wick is also clamped at this time. Then the positive and negative poles of the wick are connected to the lamp cap 6, and finally the lamp body 7 is screwed to the lamp cap 6, the lamp cap 6 of the bulb is connected to the lamp socket, and the application can be used after the power supply is connected.

Although the specific implementations of the present application have been described above, those skilled in the art should understand that these specific implementations are only examples, and those skilled in the art can make various omissions, substitutions and changes to the details of the above-mentioned methods and systems without departing from the principle and essence of the present application. For example, it is within the scope of the present application to combine the above method steps so as to perform substantially the same function in substantially the same way to achieve substantially the same results. Accordingly, the scope of the application is limited only by the appended claims.

What is claimed is:

1. A light bulb structure, comprising a wick, wherein the wick comprises a light bar (1), an upper end of the light bar (1) is provided with positive and negative poles, and the positive and negative poles are connected to the lamp cap (6), the positive and negative poles are provided with a protection resistor (2), an outer surface of the protection resistor (2) is provided with a resistor housing (3), and the resistor housing (3) is fixed in a center slot of the fixing seat (4), the fixing seat (4) is connected to an inner buckle (10) of a joint of the lamp body (7), and an outer surface of the joint of the lamp body (7) is connected to the lamp cap (6);

wherein the fixing seat (4) is configured to be a hollow structure, and eight clamping plates (5) are arranged in the fixing seat (4) at equal intervals.

2. The light bulb structure according to claim 1, wherein an upper end of the resistor housing (3) of the wick is provided with a ring boss (13), and upper ends of the eight clamping plates (5) are provided with an L-shaped clamping slot (11) for connecting the ring boss near the central slot.

3. The light bulb structure according to claim 2, wherein two butt joints (131, 132) are provided on opposite sides of the ring boss, and the L-shaped clamping slot is provided with two opposite short-side L-shaped clamping slots (12) on both sides for the butt joint clamping.

4. The light bulb structure according to claim 1, wherein ten triangular teeth (9) are provided on upper surface of the fixing seat (4), and six fixing blocks (8) are arranged on outer surface of the fixing seat (4) at equal intervals.

5. The light bulb structure according to claim 1, wherein lower end of the lamp body (7) is provided with drainage holes.

* * * * *